United States Patent Office 3,522,149
Patented July 28, 1970

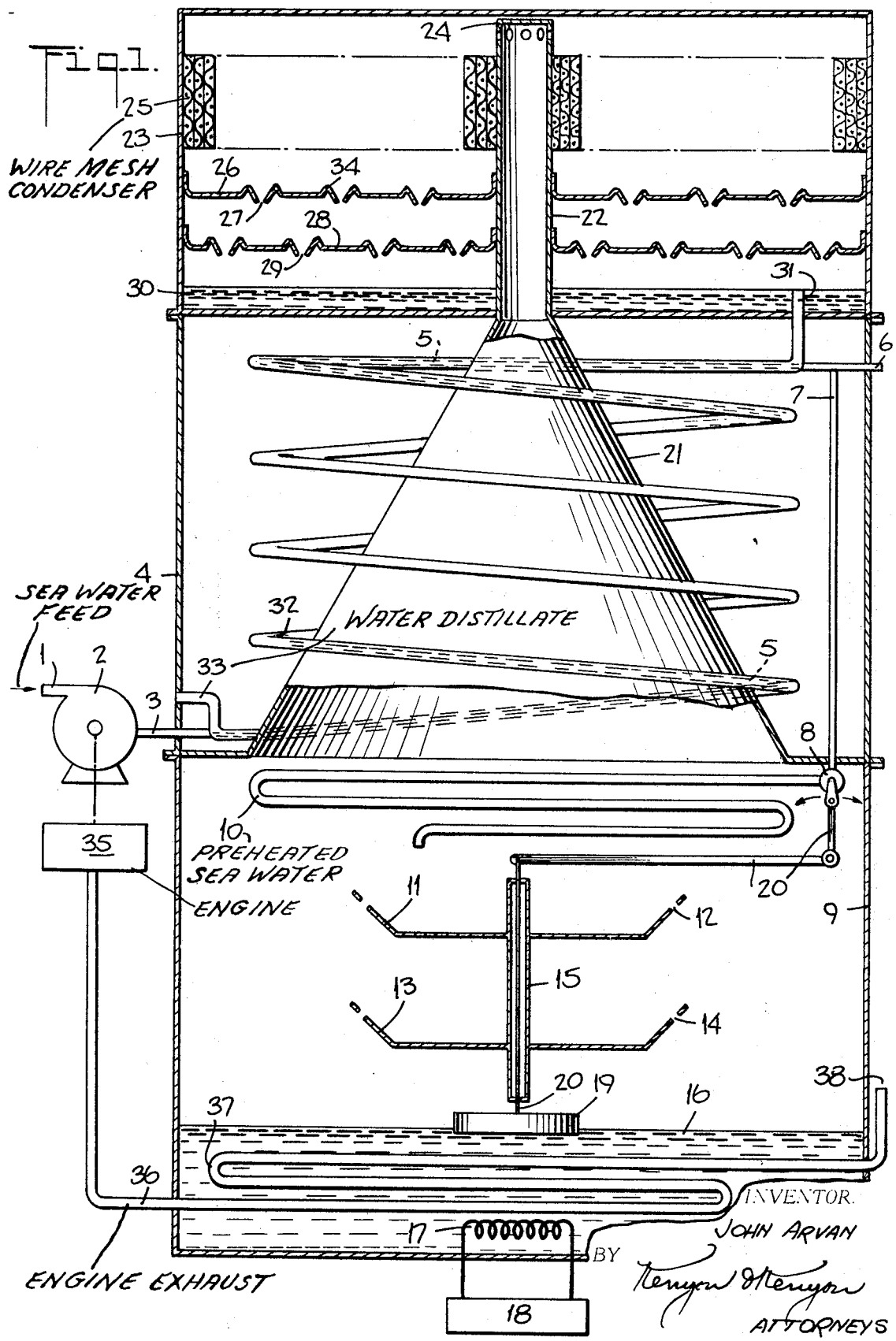

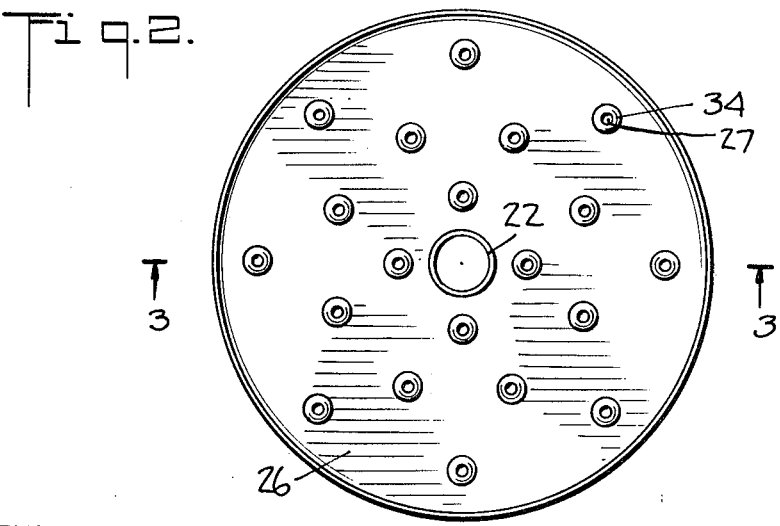
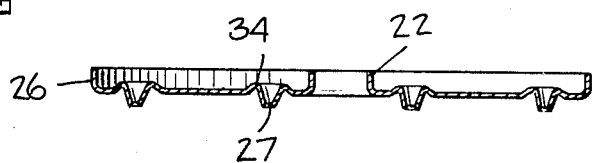
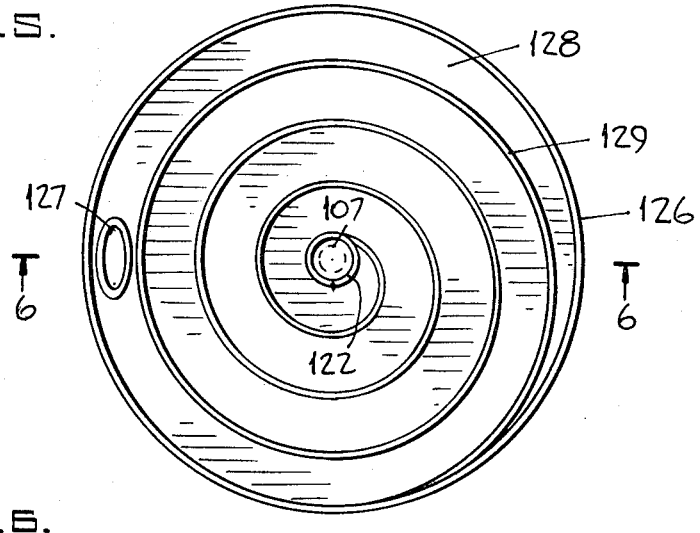
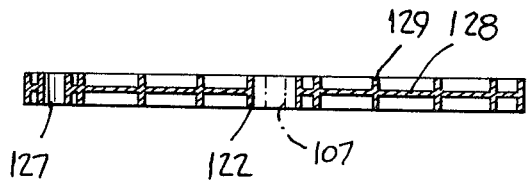

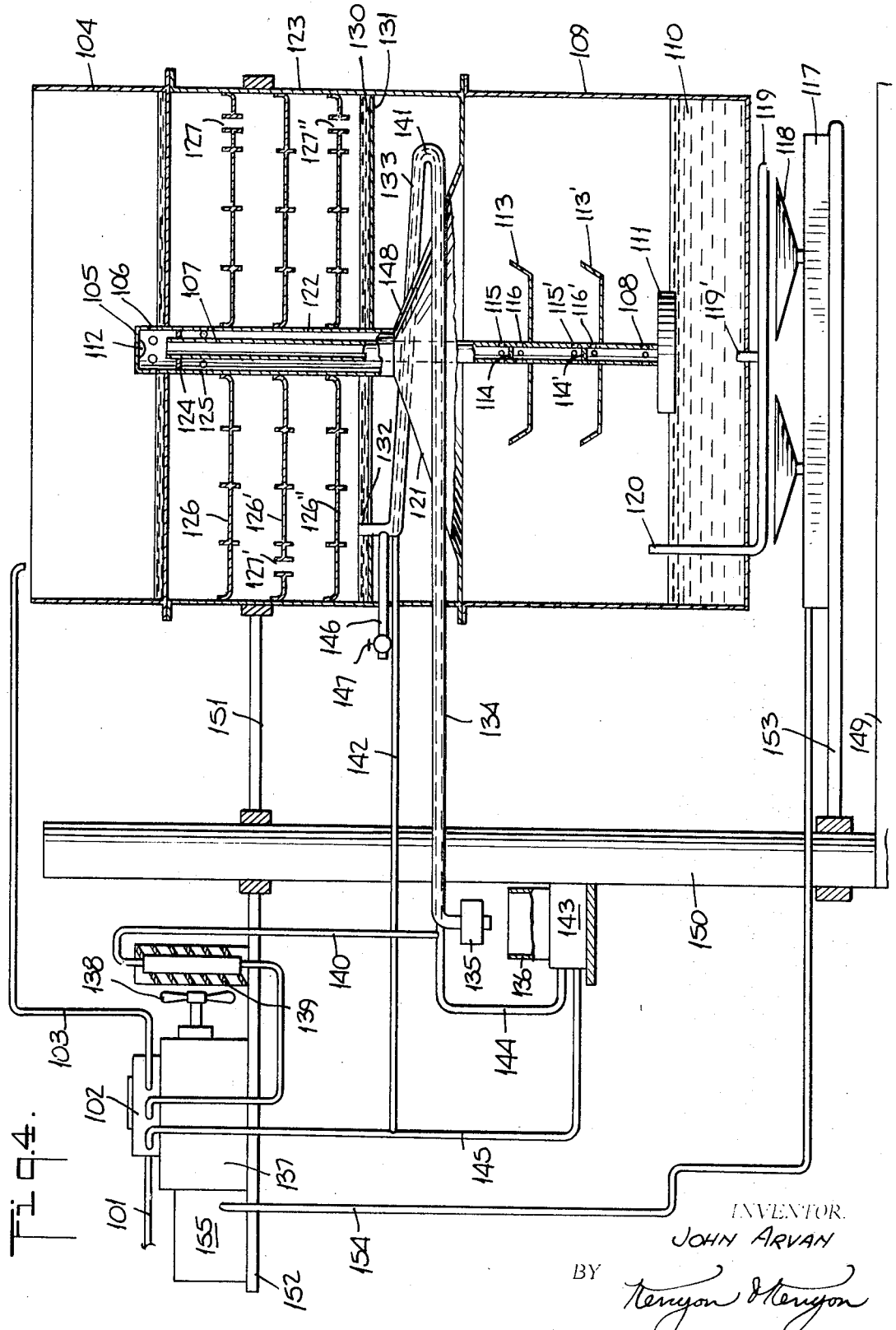

---

3,522,149
DISTILLATION APPARATUS TO RECOVER POTABLE WATER FROM NON-POTABLE WATER
John Arvan, 9 S. Main St.,
Port Chester, N.Y. 10573
Filed May 27, 1968, Ser. No. 732,149
Int. Cl. B01d 1/02; C02b 1/06
U.S. Cl. 202—196         11 Claims

ABSTRACT OF THE DISCLOSURE

This disclosure is directed to a water purifying unit which provides for the distillation of non-potable water and its subsequent condensation to a purified form. The purifier comprises a lower chamber for heating the water and upper chambers for heat transfer and condensation. A funnel-like arrangement is used to transfer the vaporized water upwards and into the condensation area.

BACKGROUND

Extensive research and development has been conducted over the years for methods and means to convert sea or brackish water into potable water. Due to the current and impending shortage of water facing many areas of the world, substantial increases in expenditures for water purification have occurred over the past few decades. However, the production cost of large-scale water purification remains unreasonably high. A great need remains for small-scale purification units in homes, on boats, or for emergency purposes. To meet these needs the highly technical and elaborate methods of large scale purification prove of little value. For small-scale units the primary criteria are ease of operation and maintenance, and low-cost. This invention is directed to meeting these standards for small-scale water purification units.

THE INVENTION

This invention is directed to a water purifier which in one embodiment comprises a bottom chamber, a middle chamber and a top chamber, with the chambers releasably interconnected to facilitate cleaning and repair. A coiled conduit conducts unpurified water from the bottom to the top of the middle chamber and a second conduit conducts the unpurified water from the top of the middle chamber to the bottom chamber where the unpurified water forms a pool. A heating means is arranged to raise the temperature of this pool of unpurified water, and may comprise a series of fuel burners or an electrical heating element. Additional heat may be provided from the exhaust gases of an internal combustion engine which is used to drive a water pump. A funnel means in the middle chamber is positioned to direct the flow of vapor from the pool to the top chamber where a metal screen and a series of condensing plates are located to receive the water vapor and to pass it downwardly through the top chamber while undergoing condensation to purified water. A third conduit at the bottom of the top chamber is adapted to direct purified water therefrom into a fourth coiled conduit in the middle chamber in heat conductive relationship to the first coiled conduit. The exchange of heat between these two coiled conduits raises the temperature of the incoming unpurified water so that it may be more easily vaporized and lowers the temperature of the purified water so that it is more suitable for human consumption.

The water purified also includes a valve means situated in the above-noted second conduit, and a float means on the pool of unpurified water interconnected to said valve to control the flow of unpurified water into the pool. In addition the water purified has a series of collecting plates in the bottom chamber which are adapted to receive unpurified water from the second conduit and to pass it slowly to the pool of unpurified water.

In an alternative embodiment the funnel and condensing plates may be located in the middle chamber and the top chamber used to provide a source of unpurified water. The purified water may be used at its elevated temperature of condensation or may be cooled by refrigeration means.

This invention will be described in greater detail in connection with the accompanying figures.

FIG. 1 is an embodiment of the water purifier having a funnel mouth and heat exchange means in a middle chamber and the funnel stem and condensation means in the top chamber.

FIGS. 2 and 3 depict condensation plates used in the embodiment of FIG. 1.

FIG. 4 is an embodiment of the water purifier having the funnel means and condensation means in the middle chamber and a source of unpurified water in the top chamber.

FIGS. 5 and 6 depict condensation plates used in the embodiment of FIG. 4.

A simplified illustration of the invention is given in FIG. 1. Sea water or other nonpotable water is drawn through conduit 1 by pump 2. From the pump the water is conducted through conduit 3 into chamber 4. For use in the home or where water pressure is available, the pump may be eliminated and conduit 3 would be connected to a faucet or similar source of water. Within chamber 4 the water passes through the coiled conduit 5 in a generally upward direction and exits from chamber 4 through conduit 6. This unused water may be recycled back to pump 2 and reused if the water supply is limited. Near the exit of the sea water from chamber 4 a portion of the water is drawn through conduit 7 to valve 8, within lower chamber 9. From valve 8 the water passes through coiled conduit 10 in the path of upcoming steam, and is discharged onto plate or container 11. Plate 11 has holes 12 therein from which the water passes downward onto lower plate 13 which similarly has holes 14 therein. Additional plates similar to 11 and 13 may be located within chamber 9. These plates are supported by tube 15 which in turn is connected by brackets to the wall of chamber 9 (said brackets not shown). From the lowermost plate, 13, the water collects in the bottom of chamber 9, said water shown by numeral 16. At the bottom of chamber 9 the water is heated to the boiling point, for example, by means of electrical element 17 connected to a power and control source 18. The upcoming steam will preheat the downcoming unpurified water on plates 11 and 13 and the water in coil 10.

The power and control source 18 may be merely a switching and thermostat station with a provision being made for connection to ordinary house current to provide the power to heat element 17. Alternatively, unit 18 can include a generator to be connected to a gasoline engine to provide the power to heat element 17. Unit 18 may comprise conventional safety features, such as fuses and thermostatic controls to conserve electricity when, for example, an associated thermocouple indicates that the temperature of the water 16, is at its boiling point. Unit 17 and 18 may be eliminated and alternative heating means employed, such as a fuel burner system depicted below in FIG. 4, or else the entire unit may be placed on a stove to be heated.

As the level of water 16 changes float member 19 will move and the connecting rods 20 will actuate valve 8 to pass additional sea water into chamber 9 as the level of water 16 falls, or to prevent the further flow of sea water into chamber 9 when the level rises above a predetermined point. As the water 16 is heated to the boiling point it will pass into the vapor phase and travel upward into middle container 4 and into the funnel structure 21. From the funnel structure the vapor will be conducted upward through conduit 22, the funnel stem, in upper chamber 23. The vapor will pass outward from conduit 22 through distributor cap 24. From the distributor cap the vapor will pass over the wire mesh 25 which provides a condensing surface. The screen 25 may be a wire mesh or perforated sheet made of a corrosion resistant material, such as aluminum. The mesh depicted is wrapped around funnel extension 22 and in a spiral-like configuration extends outwardly to the walls of chamber 23, thus providing maximum surface area for condensation.

From 25 the condensed water and vapor will pass downward and collect on plate 26. From plate 26 the condensed water and remaining vapor will pass through holes 27 therein to the lower plate 28. A number of plates similar to 26 and 28 may be provided in upper chamber 23. From plate 28 the condensed vapor will pass through holes 29 and the purified water will collect in the bottom of chamber 23 as illustrated by numeral 30. The purified water accumulates in this lower collecting area until it reaches the height of the inlet of conduit 31 from which it passes into the middle chamber 4. The purified water will then be circulated through coiled conduit 32 and will pass downwardly through middle chamber 4 to exit from conduit 33. Coil 32 may be positioned within coil 5 or coil 32 may surround coil 5; either arrangement provides heat transfer in which the incoming sea water is heated by purified water so that it may vaporize more easily and in turn the purified water is cooled to make it more suitable for human consumption. In the preferred embodiment coil 32 surrounds coil 5 thus effecting maximum heat transfer without unduly cooling chamber 4, which otherwise would cause condensation within funnel 21.

As an alternative to discharging the steam from distributor 24, it may be discharged directly into the pool of water 30. This assists in the rapid condensation of the steam. A further cooling effect can be obtained by directing a portion of the purified water either from a conduit similar to 31 or from 33 to the pump 2 and then by a conduit from the pump into the top of chamber 23. By thus spraying recycled purified and cooled water over the metal screen 25 and plates 26, 28, the temperature control in the top chamber is improved.

FIGS. 2 and 3 depict in greater detail the construction of plate 26 and like plates. FIG. 2 is a top view of plate 26 and FIG. 3 is a view through line 3—3 of FIG. 2. As depicted, the funnel extension 22 rises through plate 26. Plate 26 is provided with a series of small openings 27 which are surrounded by ridges 34. These ridges 34 provide collecting areas therebetween for small amounts of condensed vapor which overflow the ridges and pass through holes 27 to a lower plate or collecting area.

The pump 2, referred to above, may be driven by any suitable means, such as an electric motor or a gasoline engine. When a fuel powered motor 35 is used to drive the pump 2, or to provide electric power, the exhaust from this motor may be used to provide further heat to the pool of water 16. This is illustrated by conduit 36 which delivers the exhaust to a coil 37 and which discharges the exhaust through 38.

A water cooled engine, as in some cars and boats, can be used to provide the pump and cooling water. In such an embodiment conduit 3 is connected to the water outlet of a cooling radiator and the water is returned to the engine unit from conduit 6. This arrangement may also be used in the embodiment of FIG. 4.

Additional elements (not shown) useful in the water purifying apparatus include: a pressure removable safety valve, for example at the top of the unit; a pressure gage in the bottom chamber; a water level sight gage in the bottom chamber; chamber handles and joints; and a support for the unit. Each chamber is releasably connected to its adjacent chamber, preferably by a simple twist-off interlocking joint, to provide for easy access and maintenance. The construction of the purifier is preferably from corrosion resistant materials such as stainless steel and aluminum, the latter being preferred where high heat conduction is desired.

In an alternative embodiment of this invention, shown in FIG. 4, sea water is drawn from conduit 101 by pump 102 and delivered through pipe 103 into top chamber 104. From 104 the water enters the valve cap 105 through holes 106 from which the water passes into the open top of conduit 107. The water passes from conduit 107 through holes 108 into bottom chamber 109 where it accumulates, as shown by numeral 110. The float 111, affixed to the bottom of conduit 107 maintains the level of water 110. As the level of the water rises, float 111 moves conduit 107 upward until the opening at the top of conduit 107 engages the rubber nipple 112, thus preventing any further water from entering bottom chamber 109.

Tray 113 provides a hold-up supply of water within chamber 109. This is accomplished by means of plug 114 which blocks the flow of water in conduit 107. The water exits from the conduit through holes 115 to fill tray 113. When the level of water in tray 113 rises to the height of holes 116 the water flows back into the conduit. The water in conduit 107 is similarly blocked by plug 114' and flows out from holes 115' to fill tray 113', whereupon the water re-enters conduit 107 through holes 116'. As described above, the water finally exits from holes 108 to accumulate at the bottom of container 109.

A heating means is located below chamber 109 to heat the sea water. A tank 117 provides fuel to burners 118 which heat the accumulated water 110. Simultaneously the burners heat the water in spiral coil 119. This spiral coil receives water from the bottom of chamber 109 through connecting conduit 119'. The purpose of coil 119 is to provide a fast supply of steam which exits through connecting conduit 120 into chamber 109. A one-way valve may be incorporated into conduit 119' which will permit the entry of water into 119 and prevent the escape of steam. The heating means defined in conjunction with FIGS. 1 and 4 may be used interchangeably with either embodiment.

The water vapor or steam rising from conduit 120 and from the pool 110 is directed by the funnel shaped member 121 into conduit 122. Members 121 and 122 are positioned in middle chamber 123 (supports for said members not shown). Conduit 107, referred to above, is positioned within conduit 122; plug 124 prevents the intermixing of the sea water and steam near the tops of conduits 107 and 122. Vapor from conduit 122 exits from vent holes 125 and is condensed on plates 126, 126', and 126". The number of plates used may vary widely and will depend upon the size of chamber 123. The water vapor from 122 condenses on plates 126 and passes through holes 127, 127', and 127", in the respective plates. The plates, shown in greater detail in FIGS. 5 and 6, provide a spiral pathway for the condensed vapor in channels 128 formed by ridges 129. Water condenses in these channels 128 and provides a pool of water which flows through the spiral path and downward through drain holes 127. The purified water 130 collects on plate 131. As the level of the purified water 130 rises it flows into pipe 132 and then through the spiral conduit 133. Exit pipe 134 carries the purified water through filter 135 into container 136.

A cooling unit comprises the motor 137 from the pump 102, a fan 138 and baffle unit 139. The cooling unit provides water from pump 102, which is cooled by passage through baffle 139. The cooled water then flows through conduit 140 to conduit 141 which is positioned in coil 133. The cooling water exits into conduit 142 at which point it has become considerably warmer due to heat transfer from the purified water. From 142 the water re-enters pump 102 and repeats the cycle. A modification of this cooling cycle is to use a refrigerant in place of the water thus providing a lower temperature fluid for recycle through the path defined by conduits 140, 141, 142. When a refrigerant is used provision can be made for turning the purified water into ice unit 143, which is connected to the refrigerant pump by conduits 144 and 145. Warm purified water may be obtained from a point near conduit 132 as illustrated by conduit 146 and valve 147.

The funnel 121 may be provided with insulation 148 to prevent it from being cooled by the refrigerant. Such cooling would cause undue condensation of the vapors arising from chamber 109. Insulation may also be used around conduit 122 to reduce the condensation of vapor therein. Similarly such insulation may be used around the funnel 21 and conduit 22 of FIG. 1.

The purifier unit described above is mounted on base and support members 149, 150, 151 and 152. The burner unit 117, 118 is supported on a pivotal mount 153 which can rotate around member 150 to facilitate removal and cleaning of chamber 109. To accommodate this movement a flexible tube 154 is used to deliver fuel from tank 155 to 117. This same tank 155 provides fuel to power the pump motor 137.

Chambers 109 and 104 are affixed to chamber 123 by any easily removable means (not shown) to facilitate cleaning thereof. For example a simple bolt, clamp, or interlocking channel arrangement is suitable.

This invention has been described in terms of specific embodiments set forth in detail. Alternative embodiments will be apparent to those skilled in the art in view of this disclosure, and accordingly such modifications are to be contemplated within the spirit of the invention as disclosed and claimed herein.

What is claimed:

1. A water purifier for the treatment of non-potable water to produce potable water comprising a bottom chamber, a middle chamber and a top condenser chamber, said chambers releasably interconnected, a first coiled conduit to conduct unpurified water from the lower section of said middle chamber to the upper section of said middle chamber, a second conduit to conduct said unpurified water from the upper section of said middle chamber to said bottom chamber where said unpurified water forms a pool, heating means arranged to raise the temperature of said pool of unpurified water, an inverted funnel member in said middle chamber within the coil of said first conduit, said funnel forming the top closure wall of said bottom chamber, said funnel having a stem extending upwardly into said top condenser chamber, said funnel and stem positioned to direct the flow of vapor from said pool to said top chamber, condensing means including a series of collecting plates in said top chamber adapted to receive said water vapor from said stem and to pass the same downwardly through said top chamber, third conduit means at the lower section of said top chamber adapted to direct purified water therefrom into a fourth coiled conduit in said middle chamber in heat conductive relationship to said first coiled conduit and adapted to deliver said purified water therefrom.

2. The water purifier of claim 1 comprising a valve means situated in said second conduit, and a float means on said pool of unpurified water interconnected to said valve to control the flow of unpurified water into said pool.

3. The water purifier of claim 1 comprising a series of collecting plates in said bottom chamber adapted to receive unpurified water from said second conduit and to pass said water to the bottom of said bottom chamber.

4. The water purifier of claim 1 comprising a pump adapted to drive unpurified water through said first coiled conduit, an internal combustion engine adapted to drive said pump, a heating conduit in said pool of unpurified water connected to receive the exhaust gases from said internal combustion engine to pass the exhaust gases in indirect heat exchange with the unpurified water and to discharge said exhaust outside of said bottom chamber.

5. The water purifier of claim 1 wherein said collecting plates have holes therein adapted to pass water and water vapor therethrough and having ridges thereon adapted to form collecting pools of water therein which overflow into said holes.

6. The water purifier of claim 1 comprising a metal screen coiled about the top of said stem to provide a condensing surface.

7. The water purifier of claim 1 comprising a conduit below said bottom chamber in communication both with a conduit which terminates just inside said bottom chamber and another conduit which terminates above the water level of said pool.

8. A water purifier for the treatment of non-potable water to produce potable water comprising a bottom chamber, a middle condenser chamber and a top chamber, said chambers releasably interconnected, said top chamber adapted to provide a supply of unpurified water to said bottom chamber, heating means arranged to raise the temperature of said unpurified water in said bottom chamber and to provide a source of purified water vapor, an inverted funnel and stem means in said middle chamber positioned to direct the flow of water vapor from said bottom chamber upwardly to said middle chamber, said funnel forming the top closure wall of said bottom chamber, said stem means having apertures therein for the passage of water vapor from the funnel into said middle condenser chamber, a series of vertically spaced condensing plates in said middle chamber adapted to receive water vapor from said funnel and stem and condense the same to recover purified water as condensate, storage means beneath said condensing plates to collect said condensate, and conduit means communicating with said storage means and disposed in said middle chamber to direct a supply of purified water therefrom.

9. The water purifier of claim 8 comprising a cooling means, a second conduit adapted to receive coolant from said cooling means and third conduit means to pass said coolant in heat conductive contact with said purified water.

10. The water purifier of claim 8 comprising a conduit within said funnel means and extending upwardly of said stem, said conduit adapted to receive unpurified water from said top chamber, collecting plates within said bottom chamber adapted to hold a supply of water therein, said collecting plates supported on said conduit to receive water therefrom, float means positioned on the bottom of said conduit in contact with unpurified water in said bottom chamber, said float means supporting said conduit by its buoyancy in said water, and means adapted to prevent the flow of unpurified water from said top chamber into said conduit when said float rises above a predetermined point.

11. The water purifier of claim 8 comprising a conduit within said funnel means and extending upwardly of said stem, said conduit adapted to receive unpurified water from said top chamber, float means positioned on the bottom of said conduit in contact with unpurified water in said bottom chamber, said float means supporting said conduit by its buoyancy in said water, and means adapted to prevent the flow of unpurified water from said top chamber into said conduit when said float rises above a predetermined point.

References Cited

UNITED STATES PATENTS

| | | | |
|---|---|---|---|
| 845,286 | 2/1907 | Wittemann | 203—10 |
| 851,045 | 4/1907 | Ubrick | 202—196 X |
| 1,369,438 | 2/1921 | Jewell | 202—181 X |
| 1,762,898 | 6/1930 | Sorensen | 202—196 |
| 2,475,482 | 7/1949 | Clemens | 202—194 |
| 3,204,861 | 9/1965 | Brown | 203—11 X |
| 3,408,262 | 10/1968 | Matye | 203—11 X |

NORMAN YUDKOFF, Primary Examiner

F. E. DRUMMOND, Assistant Examiner

U.S. Cl. X.R.

202—200, 202; 203—11